Dec. 2, 1958 W. T. SELSTED 2,862,677

MAGNETIC TAPE REEL ASSEMBLY

Filed Aug. 11, 1954

INVENTOR.
Walter T. Selsted

BY Flehr and Swain

ATTORNEYS 2,862,677
Patented Dec. 2, 1958

2,862,677

MAGNETIC TAPE REEL ASSEMBLY

Walter T. Selsted, San Mateo, Calif., assignor to Ampex Corporation, Redwood City, Calif., a corporation of California Application August 11, 1954, Serial No. 449,232
4 Claims. (Cl. 242—68.3)

This invention relates generally to magnetic tape reel assemblies such as are used in magnetic tape recording and/or reproducing machines.

In the construction of magnetic tape recording and/or reproducing machines, such as are used for the recording or reproduction of sound or other recordable frequencies, it has become common practice to employ turntables for mounting supply and takeup reels. The reels are generally of light construction and for example may be made of suitable molded plastic. The magnetic tape extending between the reels is engaged by a driving capstan, and moves in cooperative relation with a magnetic head assembly. Various mechanical arrangements have been used for holding the reels upon the turntables. One of the most common arrangements is to thread the stud of the turntable, and to employ a threaded retaining knob, by means of which the reel is clamped and retained in place. Threaded clamping and retaining devices of this kind are not convenient to use, and in general they are not well adapted for use with machines to be sold and used in the home field. In the hands of an unskilled person a threaded clamping and retaining device may be used improperly, with possible damage to the reels, or with possible bending or distortion of the reels to interfere with proper operation of the machine.

In general it is an object of the present invention to provide an improved magnetic tape reel assembly which can be readily operated by unskilled persons, and which will at all times provide proper operative positioning and retention of the tape reels upon the turntables.

Another object of the invention is to provide an assembly of the above character which will greatly facilitate application and removal of the tape reels from the turntables.

Another object of the invention is to provide an assembly of the above character which will avoid the use of conventional threaded parts, and which is of extreme mechanical simplicity.

Additional objects and features of the invention will appear from the following description in which the preferred embodiment has been set forth in detail in conjunction with the accompanying drawing.

Referring to the drawing.

Figure 1:
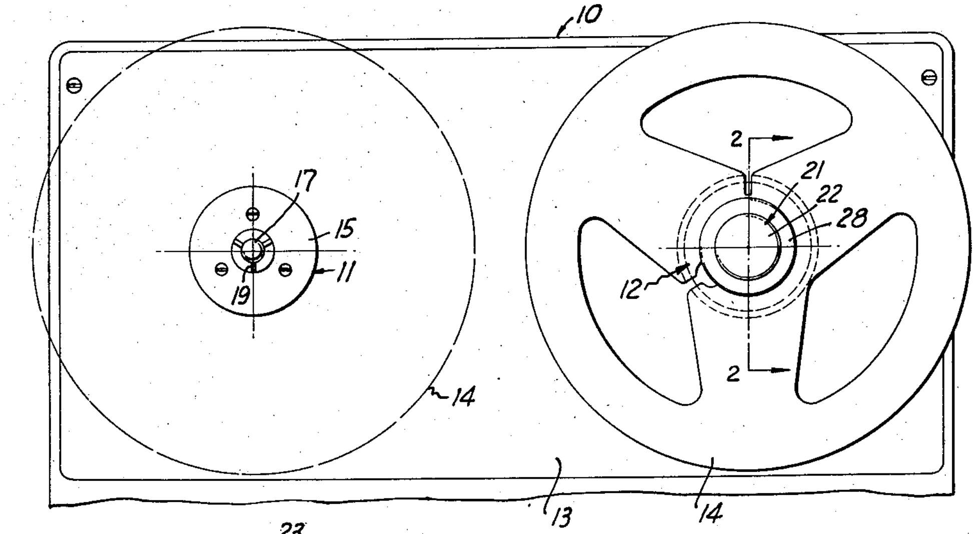
Figure 1 is a front view illustrating a portion of a magnetic tape machine with two turntables.

In Figure 1 I have schematically illustrated a magnetic tape machine having a housing 10, which encloses the working parts. A pair of turntables 11 and 12 are mounted upon the front panel 13, and serve to mount the tape reels 14. Each turntable includes a disk-like member 15 which is carried by suitable journal and shaft means (not shown), and which provides a flat surface 16 for engaging one side of the reel 14. A stud shaft 17 extends from the member 15, and is adapted to interfit the central opening 18 in the reel. Driving spurs or pins 19 establish driving engagement with the reel.

A reel retaining device 21 is removably attached to the stud 17, and serves to hold the reel in operative position upon the turntable. Preferably the device 21 is formed entirely of resilient material, such as suitable natural or synthetic rubber. Its outer portion 22 is shaped like a knob to enable it to be conveniently engaged by the fingers of an operator. It has a central opening 23 adapted to accommodate the free end of the stud shaft 17. The stud shaft is provided with an annular groove 24, which accommodates a resilient ridge 26 formed integral with the device 21. The shaft end portion 27 is rounded as illustrated, to facilitate application of the device.

Figures 2, 3:
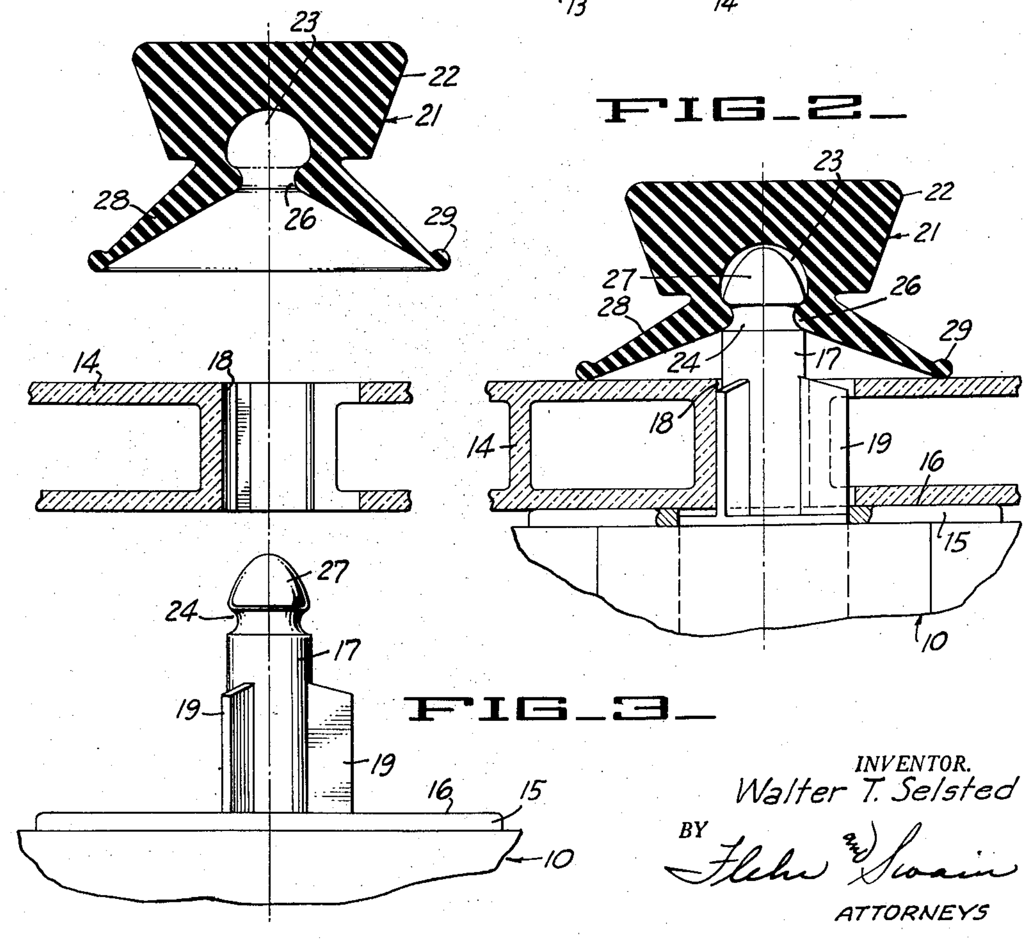
Figure 2 is an enlarged cross sectional detail taken along the line 2—2 of Figure 1.
Figure 3 is an exploded view in section, illustrating the various parts of Figure 2.

The device 21 includes a flared skirt 28 which is generally in the form of a truncated cone as viewed in Figure 2. The annular peripheral portion 29 can be formed with a bead as illustrated, and is adapted to yieldably press upon the adjacent side surface of the reel 14. The dimensions are such that when the device 21 is removed from the shaft, it assumes the form illustrated in Figure 3. However upon applying it to the shaft the skirt 28 is deflected laterally by engagement with the reel, to assume a shape as illustrated in Figure 2, and to yieldably urge the reel upon the turntable.

Operation of the assembly described above is as follows: The device 21 is removed from the stud shaft 17 simply by pulling it manually whereby the ridge 26 is expanded and distorted sufficiently to permit its retraction from the groove 24. After application of a reel upon the turntable, the device 21 is manually reapplied to the shaft, by forcing it over the rounded end portion 27. In this operation the ridge 26 is again distorted and expanded, until it snaps in place within the groove 24. As the device 21 is being applied, the peripheral edge 29 of the skirt 28 is brought into contact with the adjacent face of the reel and the skirt is deflected somewhat as previously described. Therefore after having been applied in the manner shown in Figure 2, the bead 29 yieldably presses against the adjacent side of the mount, to hold the reel upon the turntable and to yieldably urge it against the turntable surface 16.

It will be evident from the foregoing that I have provided an assembly having many advantages over the use of threaded retaining knobs such as previously described. The device 21 can be quickly applied and removed, and when applied in the manner shown in Figure 2, it exerts a uniform pressure against the reel, thus preventing any looseness between the reel and the associated turntable such as might cause objectionable fluttering or other improper operation. The amount of force exerted by the device 21 upon the reel is always optimum, and is insufficient to cause any injury.

I claim:

1. In a magnetic tape reel assembly for magnetic tape machines, a turntable having a flat surface adapted to engage one side of a tape reel, said turntable including a stud disposed perpendicular to said surface and adapted to extend through a central opening in the reel, said stud having an annular groove formed about the periphery of its free end portion, and a reel retainer formed of resilient rubber adapted to be removably engaged with the free end portion of the stud, said retainer having a central opening therein adapted to accommodate the free end portion of the stud and having an annular rib of resilient rubber adapted to be removably retained within said groove, said rib being distortable to permit removal from the groove, said retainer also including an annular portion of resilient rubber adapted to engage and yieldably press against the corresponding side of the reel.

2. In a magnetic tape reel assembly for magnetic tape machines, a turntable having a flat surface adapted to engage one side of a tape reel, said turntable including a stud extending perpendicular to said surface and adapted to extend through a central opening in the reel, said stud having an annular groove formed about the periphery of its free end portion, and a reel retainer formed entirely of resilient rubber, said retainer having an opening therein adapted to accommodate the free end portion of the stud and having an integral annular rib of resilient rubber adapted to be removably engaged in said groove, whereby the retainer is removably held upon the stud, said rib being distortable to permit removal of the retainer from the stud by manual force applied to the same in a direction away from the reel, said retainer including an integral annular skirt portion generally in the form of a truncated cone, the outer annular edge of said skirt portion being adapted to yieldably press upon the adjacent side of the reel along an annular region of contact spaced outwardly from the central opening.

3. In a tape reel assembly for magnetic tape machines, a turntable having a flat surface adapted to engage one side of a tape reel and also having a stud extending perpendicular to the said surface and adapted to extend through a central opening in a tape reel engaged with said surface, a separate reel retainer adapted to be removably engaged with the free end portion of the stud, said retainer including a knob-like part and an annular portion of resilient rubber carried by the knob-like part and serving normally to yieldably press upon the corresponding side of the reel in a region spaced radially from the central opening, and snap-on means serving to removably hold the retainer upon the stud, said last means including interfitting portions carried respectively by the knob and the stud, one of said portions being retracted by manual movement of the retainer in a direction axially of the stud to apply or remove it therefrom.

4. An assembly as in claim 3 in which both the knob-like part and the annular portion are formed of resilient rubber and in which that one of the interfitting portions carried by the knob-like part is likewise formed of resilient rubber and integral with the knob-like part.

References Cited in the file of this patent

UNITED STATES PATENTS

| | | |
|---|---|---|
| 341,952 | Shipman | May 18, 1886 |
| 431,794 | Anderson | July 8, 1890 |
| 1,933,502 | Chason | Oct. 31, 1933 |
| 2,166,894 | Jones | July 18, 1939 |
| 2,529,420 | Ramquist | Nov. 7, 1950 |
| 2,677,727 | Haynes | May 4, 1954 |
| 2,755,037 | Sarah | July 17, 1956 |